Nov. 5, 1957  H. S. DE YOUNG  2,811,982
SUB-SURFACE IRRIGATION SYSTEM
Filed Jan. 30, 1956
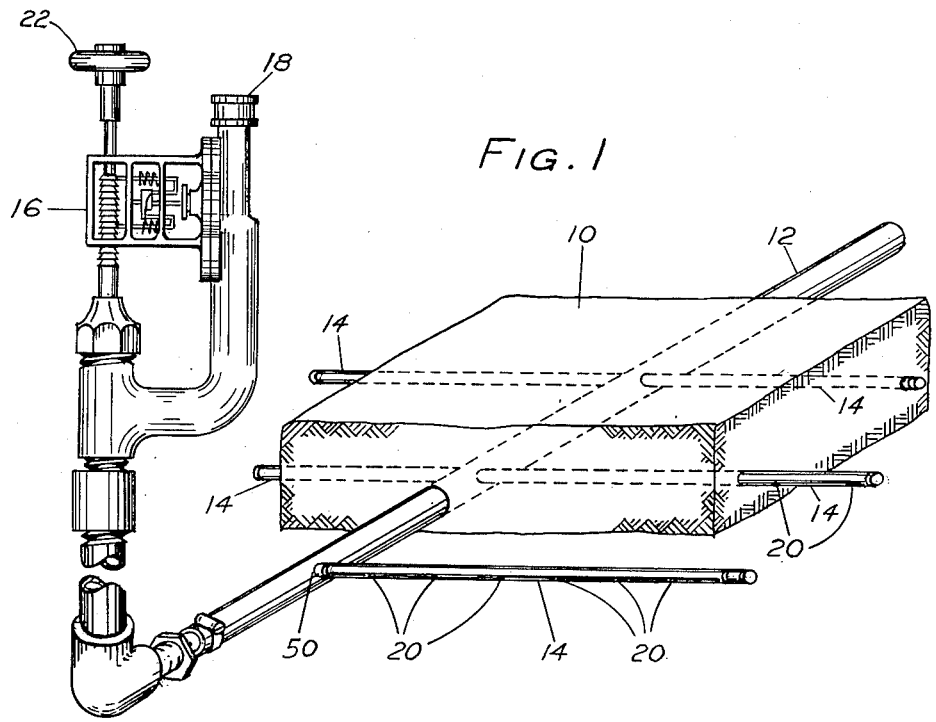
FIG. 1
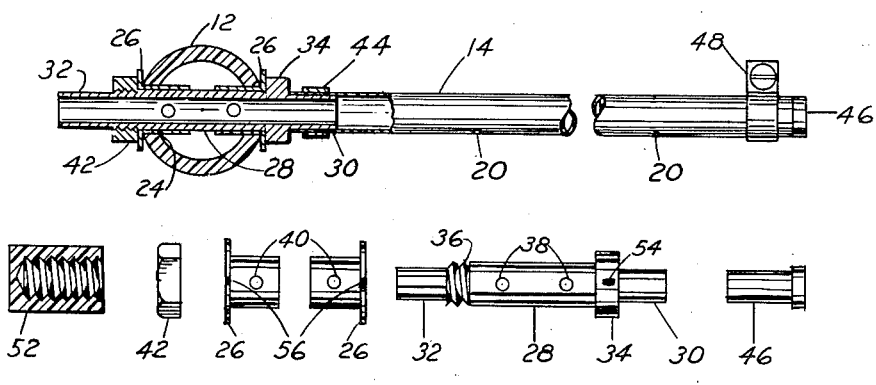
FIG. 2
FIG. 3
INVENTOR.
Howard S. De Young
BY Roy E. Petherbridge

United States Patent Office 2,811,982
Patented Nov. 5, 1957

2,811,982

SUB-SURFACE IRRIGATION SYSTEM

Howard S. De Young, Chicago, Ill.

Application January 30, 1956, Serial No. 562,108

2 Claims. (Cl. 137—561)

This invention relates to sub-surface irrigation or watering systems and more particularly relates to such systems that are readily assembled and fabricated for various size areas and which provide uniformity of water distribution.

In the past, watering systems for lawns have been of the sprinkler type wherein water is sprayed over the surface of the ground either from a manually operated hose, a movable sprinkler or a permanent piping sprinkler system laid in the ground. Watering of lawns by this method is unsatisfactory for several reasons. For instance a lot of water is wasted through run off and evaporation, the lawn cannot be used during or for sometime after sprinkling, watering can't be done during the period when the hot sun is out because of scorching, and evening surface watering is known to encourage growth of damaging virus, etc. With sub-surface irrigation, these as well as many other disadvantages are avoided. Also with the novel sub-surface watering system of this invention, the water is discharged below the surface of the ground at or near the roots.

Accordingly the objects of my invention are to provide a sub-surface watering system which (1) is simple in construction, inexpensive and convenient to assemble and install, and yet fully effective in operation; (2) can be assembled to accommodate any reasonable area; (3) is provided with a novel construction and arrangements to adjustably control the water delivered from the various parts of the system; and (4) provided with standard parts and fittings to enable the fabrication of particular system layouts as required by the shape and size of the area to be watered.

These and other objects and advantages will become readily apparent as the description proceeds and is read in conjunction with the accompanying drawings, in which:

Fig. 1 is a layout view of the sub-surface irrigation system of my invention, including the novel control valve.

Fig. 2 is a sectional view showing the apparatus for connecting the water distributing lines to the main feed line.

Fig. 3 is an exploded view of the connecting fitting.

It should be understood that the attached drawings and this specification describe a preferred embodiment of my invention as required by law but that various changes and modifications can be made therein without departing from the scope of the invention.

Referring to Fig. 1 of the drawings, which shows the general layout of my novel sub-surface watering system, the surface of the ground is indicated by the numeral 10 and is cut away to show the positionment of the main water feed pipe line 12 and the distribution lines 14. Main line 12 is connected through suitable fittings to a flow control valve 16, which is arranged to have a supply pipe or hose connected to inlet fitting 18. Thus when control valve 16 is open water will flow through the valve into main line 12.

Main line 12 and feeder lines 14 that are buried below the surface of the earth are preferably formed of an organic plastic material which is impervious and entirely resistant to deterioration and not subject to corrosion. Since it is impractical to dig up the sub-surface watering system during the winter, by forming the lines of plastic the freezing of water in them could not cause them to rupture as is the case of metal pipes. Also, as will hereinafter appear, all fittings that are used to connect the feeder lines to the main line 12 are preferably formed of brass, stainless steel, or plastic so as to prevent deterioration.

It will hereinafter appear that my sub-surface watering system is readily adapted for assembly on the surface of the ground before it is buried. Thus in installing the system, the main line 12 is laid on the ground and cut to length. The distributing lines 14 are then laid out on the ground at right angles to the feeder line in a pattern so as to cover all areas of the lawn or other area that is to be watered. The water lines are then attached to the main line with the fittings hereinafter described, and the entire system can be tested on top of ground to be sure of proper water distribution and then be buried below the surface of the ground by simply digging troughs corresponding to the network arrangement of the lines. The earth removed from these troughs is then replaced over the lines. Thus my underground watering system can be installed in an existing lawn without doing any damage to the lawn.

Distributing lines 14 are provided with uniformly spaced pin holes 20 throughout their length, which can be faced downward, upward or horizontally without affecting operation. Thus water will flow from the main line 12 into feeder lines 14 and be discharged throughout their length through pin holes 20 below the surface of the ground.

Control valve 16 is a metering or timing valve which measures the amount of water flowing therethrough and automatically shuts off after a pre-selected amount of water has been delivered to the main and feeder lines. In operation, handle 22 of the valve is adjusted to a position representative of the required amount of water. After the selected amount of water has been delivered to the lawn through the underground watering system, valve 16 automatically closes and stops watering operation until handle 22 is reset.

Fig. 2 is a sectional view showing the construction and arrangement of the fittings for attaching opposed feeder lines 14 and main line 12. In applying these fittings, a hole 24 is formed diametrically through main 12 at all places where a feeder line is to be connected. A flange type sleeve 26 (Figs. 2 and 3) is inserted in opposite ends of hole 24. The size of the hole drilled through main 12 is such that sleeves 26 fit snugly therein. A hollow cylindrical core piece 28 is then inserted from one side through sleeves 26.

As best seen in Fig. 3, core piece 28 has reduced end portions 30 and 32 which are of sufficient size to fit snugly within feeder lines 14. A shoulder 34 is provided near one end of core piece 28 and screw threads 36 are correspondingly positioned at the other end of the core piece. Intermediate shoulder 34 and threads 36 holes 38 are provided through one wall of the core piece. It will also be noted that sleeves 26 have holes 40 provided through one side wall.

When core piece 28 is inserted within sleeve 26, shoulder 34 will abut the flange on the right hand sleeve 26 as viewed in Fig. 2. To secure the core piece and sleeves to main line 12, a nut 42 is threaded on threads 36. Nut 42 will bear against the flange of left hand sleeve 26, as viewed in Fig. 2. By tightening nut 42, main 12 will be slightly deformed to provide a sufficient seal and prevent the escape of any water around the fittings.

As seen in Fig. 2, feeder 14 is connected to core piece 28 by means of a conventional hose clamp 44 applied over the distributing line and reduced end portion 30 of the core.

In order to prevent a substantial reduction in water pressure in the feeder lines, the ends of these lines must be closed. To this end, a plug 46 (Fig. 3) and a conventional hose clamp 48 are used.

In some cases, due to the particular configuration of the area to be watered, it is desirable to have only one feeder line connected to the main line, such as indicated at 50 in Fig. 1. When this is desired, nut 42 is replaced by an internally threaded cap 52, which is shown in Fig. 3. Cap 52 is tightened over threads 36 of the core piece so as to connect and seal the core piece to the main line and at the same time close off one end of the core piece.

For obvious reasons, it is extremely important in utilizing my underground watering system that water be evenly distributed throughout the irrigated area. This is difficult to accomplish since the water pressure reduces in the main line in proportion to the distance from the supply source and, therefore, more water would tend to be discharged from the feeder lines close to the supply source than would be discharged from the more remote feeder lines. An important feature of my invention is the arrangement of the fittings for connecting the feeder lines to the main line which accomplish an equal distribution of water.

Referring to Fig. 3, it will be seen that an index mark 54 is provided on the external surface of shoulder 34. Also sleeves 26 have index marks 56 thereon. When core piece 28 and sleeves 26 are assembled on main line 12 with these marks alined, holes 38 in the core piece and holes 40 in the sleeves will be concentric so that a maximum opening is presented between the interior of main line 12 and the interior of core piece 28. Thus a fairly unimpeded passage exists between main line 12 and distributing lines 14. If one or the other, or both of sleeves 26 are rotated relative to core 28, the passages between the interior of the core piece and main 12 will be reduced in area, the amount of reduction being dependent upon the positionment of the sleeves. Thus in installing my subsurface irrigation system, the various fittings for connecting the distributing lines to the main line will be adjusted to produce a less restricted flow of water into the feeder lines in progression away from the water supply.

Also, the amount of water discharged from the main line into the feeder lines can be partially controlled by connecting the fittings so that holes 38 and 40 face upstream or downstream in main 12. When the holes face upstream a greater flow exists than when they are faced downstream.

I claim:

1. In a sub-surface irrigation system, a main feed line, distributing feed lines, and fittings for connecting said distributing lines with said main feed line, said fittings comprising a hollow core piece inserted through aligned holes in the sides of said main feed line, said core piece having an opening therein whereby the interior of said core piece is in communication with the interior of said main feed line, a shoulder formed near one end of said core piece having a diameter greater than the diameter of the holes in the sides of said main feed line, a first sleeve inserted in one of the holes in the sides of said main feed line and adapted to surround said core piece, a second sleeve inserted in the other hole in the side of said main line and surrounding said core piece, threads formed on the other end of said core piece, a nut adapted to engage said threads and bear against said second sleeve to secure said core piece to said main line, one of said sleeves having a shank portion extending along said core piece over the area of the opening formed therein, said sleeve having an opening in said shank portion, whereby said one sleeve can be rotated to align the openings in the sleeve and in the core piece to provide an essentially unimpeded passage between the interior of the main line and the interior of the core piece or rotated to partially restrict passage through these openings.

2. In a sub-surface irrigation system, a main feed line, distributing feed lines, and fittings for connecting said distributing lines with said main feed line, said fittings comprising a hollow core piece inserted through aligned holes in the sides of said main feed line, said core piece having two spaced openings therein whereby the interior of said core piece is in communication with the interior of said main feed line, a shoulder formed near one end of said core piece, threads formed near the other end of said core piece, a nut for engaging said threads, sleeves inserted in the holes in the sides of said main feed line between the main feed line and the core piece, said nut engaging one of said sleeves and said shoulder engaging the other of said sleeves to secure said core piece to said main line when said nut is tightened, each of said sleeves having a shank portion overlying one of the holes formed through said core piece, said shanks each having an opening therein which is capable of being aligned with a corresponding hole in said core piece whereby said sleeves or core piece can be rotated to control communication between the interior of the core piece and main feed line.

References Cited in the file of this patent

UNITED STATES PATENTS

| 1,174,897 | Preston | Mar. 7, 1916 |
| 1,296,239 | Van Meter | Mar. 4, 1919 |
| 1,607,096 | Mueller | Nov. 16, 1926 |
| 2,459,643 | Hartley | Jan. 18, 1949 |
| 2,548,788 | Helme | Apr. 10, 1951 |
| 2,605,140 | Bartling | July 29, 1952 |

FOREIGN PATENTS

| 1,041,914 | France | June 3, 1953 |